United States Patent
Tsuchiya

(10) Patent No.: US 7,199,892 B2
(45) Date of Patent: Apr. 3, 2007

(54) FACSIMILE APPARATUS AND REPEATER

(75) Inventor: Suguru Tsuchiya, Nagano (JP)

(73) Assignee: Panasonic Communications Co., Ltd., Tokyo (JP)

( * ) Notice: Subject to any disclaimer, the term of this patent is extended or adjusted under 35 U.S.C. 154(b) by 853 days.

(21) Appl. No.: 09/905,073

(22) Filed: Jul. 16, 2001

(65) Prior Publication Data

US 2002/0054367 A1   May 9, 2002

(30) Foreign Application Priority Data

Jul. 17, 2000   (JP)   ............... 2000-215823

(51) Int. Cl.
G06F 5/00   (2006.01)
H04N 1/00   (2006.01)

(52) U.S. Cl. ............... 358/1.15; 358/402; 358/407

(58) Field of Classification Search ............ 358/1.15, 358/442, 402, 444, 468, 434, 440, 407, 1.1; 379/100.01

See application file for complete search history.

(56) References Cited

U.S. PATENT DOCUMENTS

| | | | | |
|---|---|---|---|---|
| 4,754,335 A * | 6/1988 | Izawa et al. | ............... | 358/440 |
| 5,293,253 A * | 3/1994 | Kida et al. | ............... | 358/440 |
| 5,659,542 A * | 8/1997 | Bell et al. | ............... | 370/496 |
| 5,739,919 A * | 4/1998 | Lee et al. | ............... | 358/407 |
| 5,991,290 A * | 11/1999 | Malik | ............... | 370/352 |
| 6,384,927 B1 * | 5/2002 | Mori | ............... | 358/1.15 |
| 6,388,770 B1 * | 5/2002 | Kenmochi et al. | ............... | 358/412 |
| 6,389,464 B1 * | 5/2002 | Krishnamurthy et al. | ... | 709/220 |
| 6,417,930 B2 * | 7/2002 | Mori | ............... | 358/1.15 |
| 6,470,379 B1 * | 10/2002 | Mori | ............... | 709/206 |
| 6,507,414 B1 * | 1/2003 | Yoshida | ............... | 358/407 |
| 6,519,247 B1 * | 2/2003 | Yoshida | ............... | 370/352 |
| 6,567,178 B2 * | 5/2003 | Tashima | ............... | 358/1.15 |
| 6,574,196 B1 * | 6/2003 | Lee | ............... | 370/241 |
| 6,643,291 B1 * | 11/2003 | Yoshihara et al. | ....... | 370/395.5 |
| 6,683,698 B2 * | 1/2004 | Toyoda et al. | ............. | 358/1.15 |
| 6,690,480 B2 * | 2/2004 | Maeda | ............... | 358/1.15 |
| 6,700,676 B1 * | 3/2004 | Leung et al. | ............. | 358/1.15 |
| 6,728,238 B1 * | 4/2004 | Long et al. | ............. | 370/352 |
| 6,741,370 B1 * | 5/2004 | Kakoi | ............... | 358/468 |
| 6,781,721 B2 * | 8/2004 | Toyoda et al. | ............. | 358/402 |
| 6,801,546 B1 * | 10/2004 | Yoshida et al. | ............ | 370/490 |
| 6,807,185 B1 * | 10/2004 | Bell et al. | ............... | 370/410 |
| 6,836,789 B1 * | 12/2004 | Toyoda | ............... | 709/206 |

(Continued)

FOREIGN PATENT DOCUMENTS

JP   01-164147   6/1989

(Continued)

OTHER PUBLICATIONS

U.S. Appl. No. 09/327,488 to Saito, entitled "E-Mail Apparatus, Internet Facsimile Apparatus, and E-Mail Communication System", filed on Jun. 8, 1999.

(Continued)

Primary Examiner—Madeleine A V Nguyen
(74) Attorney, Agent, or Firm—Greenblum & Bernstein, P.L.C.

(57) ABSTRACT

When a multicast instruction is input, a facsimile apparatus transmits an input plurality of sub-addresses together with image data to a repeater in a single communication transaction. Thus, effective communication can be performed.

17 Claims, 20 Drawing Sheets

U.S. PATENT DOCUMENTS

| | | | |
|---|---|---|---|
| 6,882,438 B1* | 4/2005 | Kanaya | 358/1.15 |
| 6,897,985 B1* | 5/2005 | Toyoda | 358/402 |
| 2001/0012120 A1* | 8/2001 | Mori | 358/1.15 |
| 2002/0032736 A1* | 3/2002 | Idehara | 709/206 |
| 2002/0051146 A1* | 5/2002 | Tanimoto | 358/1.9 |
| 2002/0063882 A1* | 5/2002 | Sekiguchi | 358/1.15 |
| 2002/0064149 A1* | 5/2002 | Elliott et al. | 370/352 |
| 2003/0012360 A1* | 1/2003 | Kim | 379/355.01 |
| 2003/0202217 A1* | 10/2003 | Limoto et al. | 358/407 |
| 2004/0240728 A1* | 12/2004 | Saikawa et al. | 382/162 |
| 2005/0099648 A1* | 5/2005 | Maeda | 358/1.15 |
| 2005/0275873 A1* | 12/2005 | Sekiguchi | 358/1.15 |

FOREIGN PATENT DOCUMENTS

| | | |
|---|---|---|
| JP | 07-007589 | 1/1995 |
| JP | 10-126549 | 5/1998 |
| JP | 10-126551 | 5/1998 |
| JP | 10-233861 | 9/1998 |
| JP | 11-168614 | 6/1999 |
| JP | 11-205504 | 7/1999 |
| JP | 2000-22862 | 1/2000 |

OTHER PUBLICATIONS

U.S. Appl. No. 09/506,336 to Saito et al., entitled "Internet Facsimile Apparatus", filed Feb. 18, 2000.
English Language Abstract of JP 11-205504.
English Language Abstract of JP 10-233861.
English language Abstract of JP 11-168614.
English language Abstract of JP 2000-22862.
English language Abstract of JP 10-126551.
English language Abstract of JP 01-164147.
English language Abstract of JP 10-126549.
English language Abstract of JP 07-007589.

* cited by examiner

Fig. 3

209
One-touch number storage

| One-touch number | Addressee | Telephone number | Sub-address |
|---|---|---|---|
| 001 | IFAX # 2 | 0268 61 1234 | 0003 |
| 002 | IFAX # 3 | 0268 61 1234 | 0004 |
| 003 | PC # 1 | 0268 61 1234 | 0010 |
| 004 | IFAX # 1 | 0268 61 1234 | Nothing |
| 005 | IFAX # 6 | 0268 62 5678 | 0003 |
| 006 | PC # 3 | 0268 62 5678 | 0010 |
| 007 | IFAX # 5 | 0268 62 5678 | Nothing |
| ... | ... | ... | ... |

Fig. 4

213
Transmission information storage section

| One-touch number (401) | Transmitting sub-address (402) |
|---|---|
| 001 | 0003 |
| 001 and 002 | 0003 / 0004 |
| 001 and 002 and 003 | 0003 / 0004 / 0010 |
| 001 and 002 and 003 and 005 and 006 | 0003 / 0004 / 0010<br>0003 / 0010 |
| ⋮ | ⋮ |

Fig. 6

510
TCP / IP address storage section

| Sub-address | Addressee | TCP / IP address |
|---|---|---|
| 0003 | FAX # 3 | 123.31.1.13 |
| 0004 | FAX # 4 | 123.31.1.14 |
| 0010 | PC # 1 | 123.31.1.10 |
| ... | ... | ... |

Fig. 7

Transmission information storage section 512

| Sub-address 701 | TCP/IP address 702 |
|---|---|
| 0003 (1) | 123.31.1.13 (1) |
| 0003 (1) and 0004 (2) | 123.31.1.13 (1) / 123.31.1.14 (2) |
| 0003 (1) / 0004 (2) / 0010 (3) | 123.31.1.13 (1) / 123.31.1.14 (2) / 123.31.1.10 (3) |

Fig. 18

E-mail address storage section

| Sub-address | Addressee | E-mail address |
|---|---|---|
| 0003 | IFAX # 3 | ○○○@××××.△△.□□ |
| 0004 | IFAX # 4 | ○××@××××.△△.□□ |
| 0010 | PC # 1 | ○×○@××××.△△.□□ |
| ... | ... | ... |

Fig. 19

One-touch number storage section

| One-touch number | Addressee | Telephone number | Sub-address | TCP / IP address |
|---|---|---|---|---|
| 001 | IFAX # 2 | 0268 61 1234 | 0003 | 123.31.1.13 |
| 002 | IFAX # 3 | 0268 61 1234 | 0004 | 123.31.1.14 |
| 003 | PC # 1 | 0268 61 1234 | 0010 | 123.31.1.10 |
| 004 | IFAX # 1 | 0268 61 1234 | Nothing | |
| 005 | IFAX # 6 | 0268 62 5678 | 0003 | 124.31.1.13 |
| 006 | PC # 3 | 0268 62 5678 | 0010 | 124.31.1.10 |
| 007 | IFAX # 5 | 0268 62 5678 | Nothing | |
| ... | ... | ... | ... | ... |

Fig. 20

One-touch number storage section

| One-touch number | Addressee | Telephone number | Sub-address | E-mail address |
|---|---|---|---|---|
| 001 | IFAX #2 | 0268 61 1234 | 0003 | ○○○@×××.△△.□ |
| 002 | IFAX #3 | 0268 61 1234 | 0004 | ○××@×××.△△.□ |
| 003 | PC #1 | 0268 61 1234 | 0010 | ○×○@×××.△△.□ |
| 004 | IFAX #1 | 0268 61 1234 | Nothing | |
| 005 | IFAX #6 | 0268 62 5678 | 0003 | ○○△@×××.△△.□ |
| 006 | PC #3 | 0268 62 5678 | 0010 | ○○×@×××.△△.□ |
| 007 | IFAX #5 | 0268 62 5678 | Nothing | |
| ... | ... | ... | ... | ... |

FACSIMILE APPARATUS AND REPEATER

BACKGROUND OF THE INVENTION

1. Field of the Invention

The present invention relates to a facsimile apparatus that transmits sub-addresses of receiver terminals together with image information to a repeater, and relates to a repeater that transfers image information based on the received sub-addresses of receiver terminals.

2. Description of Related Art

In a conventional communication system a transmitting facsimile apparatus transfers image information to receiver terminals, such as a PC and an Internet Facsimile Apparatus (hereinafter, referred to as IFAX), via an IFAX serving as a repeater. In this communication system, the transmitting facsimile apparatus transmits a sub-address of a receiver terminal at an addressee location, together with image information to the repeater that has a designated telephone number. The repeater converts the received image information from facsimile data into e-mail data and transmits the e-mail data to the PC or IFAX that has the sub-address.

However, in the conventional communication system, the transmitting facsimile apparatus can transmit only one sub-address of a receiver terminal to a repeater in a single communication transaction. As the result, it is necessary for the transmitting facsimile apparatus to transmit the same image information to the same repeater, together with the sub-address of the addressee's receiver terminal connected to the same repeater multiple times, even when the transmitting facsimile apparatus transmits the same image information to plural PCs and IFAXes that are managed by the same repeater. Thus, the conventional communication system has problems that result in unnecessary communication and result in a higher communication cost.

SUMMARY OF THE INVENTION

The present invention is proposed with respect to the above-mentioned problem and is directed to providing a facsimile apparatus and a method of communication that can reduce communication cost by efficient communication.

According to this invention, a facsimile apparatus transmits input sub-addresses of plural receiver terminals together with image information to a repeater in a single communication transaction, when multicasting transmission is instructed.

Accordingly, since plural sub-addresses are transmitted to a repeater in a single communication transaction, it is possible to improve communication efficiency.

The present invention provides a facsimile apparatus including an input unit that inputs an identifier of a repeater and a plurality of sub-addresses of receiver terminals in association with the identifier, a controller that, upon receiving a multicast instruction, performs call processing for the repeater based upon the identifier and transmits the plurality of sub-address to the repeater, together with image information in a single communication transaction.

BRIEF DESCRIPTION OF THE DRAWINGS

The present invention is further described in the detailed description which follows, with reference to the noted plurality of drawings by way of non-limiting examples of exemplary embodiments of the present invention, in which like reference numerals represent similar parts throughout the several views of the drawings, and wherein:

FIG. 3 shows a table of a one-touch number storage section of the embodiment mentioned above.

FIG. 4 shows a table of a transmission information storage section of the embodiment mentioned above.

FIG. 6 shows a table of TCP/IP address storage section of the embodiment mentioned above.

FIG. 7 shows a table of the transmission information storage section of the embodiment mentioned above.

FIG. 18 shows a table of an e-mail address storage section of the embodiment mentioned above.

FIG. 19 shows a table of a one-touch number storage section in the modified embodiment mentioned above.

FIG. 20 shows a table of a one-touch number storage section in another modified embodiment mentioned above.

DETAILED DESCRIPTION OF THE PREFERRED EMBODIMENTS

Figure 1:
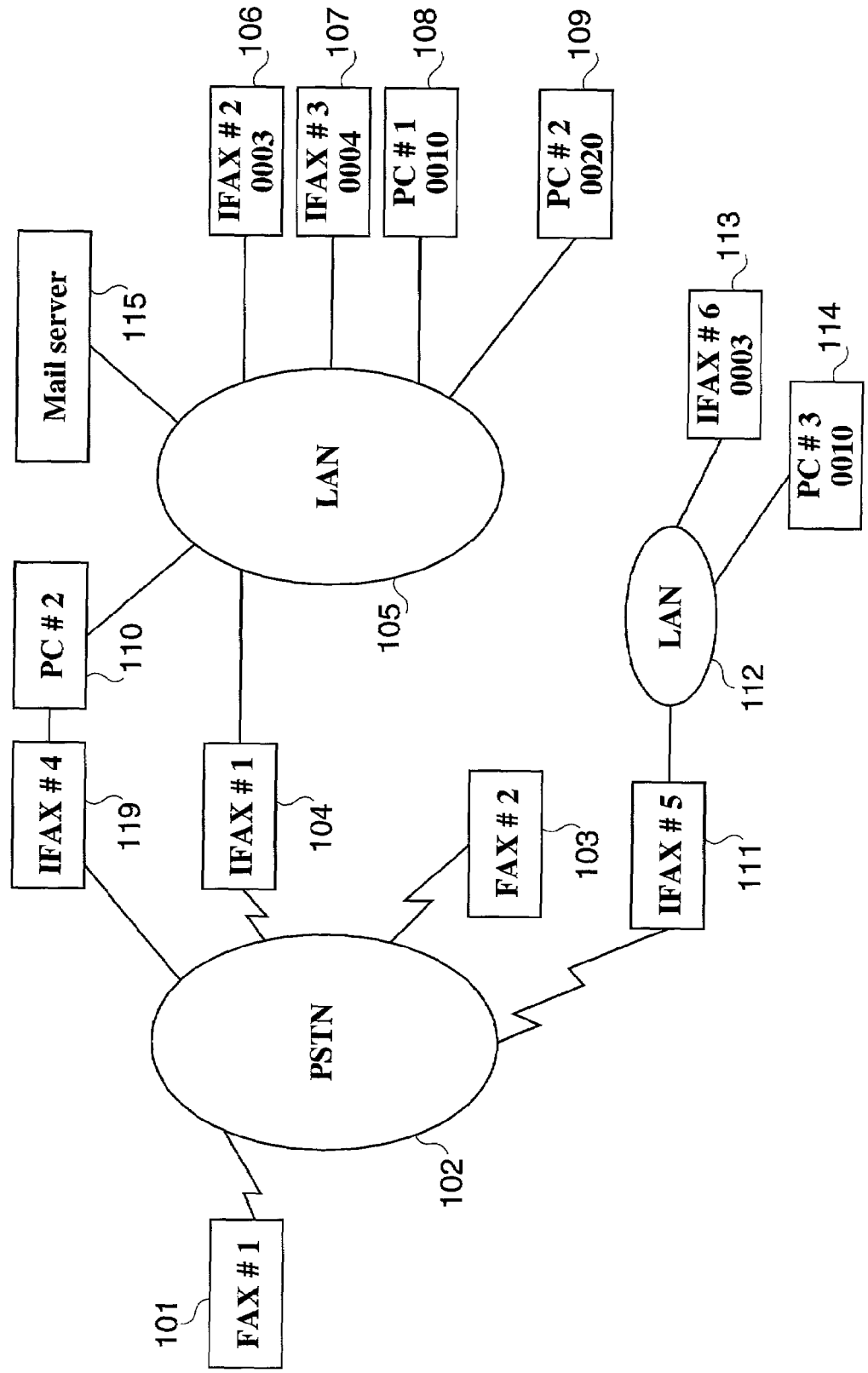
FIG. 1 is a schematic view of a communication system of an embodiment of the present invention

Hereinafter, a communication system of an embodiment of the present invention including facsimile apparatuses and Internet Facsimile apparatuses is described using FIG. 1. FIG. 1 shows a configuration of a communication system of the embodiment of the present invention.

A facsimile apparatus of the present invention (hereinafter, referred to as FAX) 101 is a facsimile apparatus that has a function of a usual facsimile apparatus, such as a G3 facsimile apparatus. The FAX 101 transmits image information to a usual facsimile apparatus FAX 103, such as G3 facsimile apparatus, or Internet facsimile apparatuses (hereinafter, referred to as IFAX) 104, 111 via Public Service Telephone Network (PSTN). Further, using the IFAX 104 as a repeater, the FAX 101 transmits image information to addressee's receiver terminals, such as IFAX 106, 107 and PC 108, 109.

The FAX 101 can transmit image information to addressee (destination) receiver terminals IFAX 113 and PC 114 via LAN 112, using IFAX 111 as a repeater. Here, telephone numbers of IFAX 104 and IFAX 111 are different. The FAX 101 can select the IFAX 104 or the IFAX 111 as a repeater using the telephone number designated at the time of transmission.

The IFAX 106, 107 and the PC 108, 109 are managed by the IFAX 104 and sub-addresses are assigned thereto. The sub-addresses of the IFAX 106, 107 and the PC 108, 109 are preset between the IFAX 104 and the IFAX 106, 107 and the PC 108, 109. In the example shown in FIG. 1, the sub-addresses of the IFAX 106, 107 and the PC 108, 109 are 0003, 0004, 0010, and 0020, respectively. Thus, by the FAX 101 adding the sub-address to the telephone number of the IFAX 104, it is possible to designate the IFAX 106, 107 and the PC 108, 109.

The IFAX 113 and the PC 114 are managed by the IFAX 111 and sub-addresses are assigned thereto. The sub-addresses of IFAX 113 and the PC 114 are preset between the IFAX 111 and the IFAX 113 and PC 114. In the example of FIG. 1, sub-addresses of IFAX 113 and PC 114 are 0003 and 0010, respectively. Thus, it is possible to designate IFAX 113 and PC 114 by the FAX 101 adding the sub-address to the telephone number of the IFAX 111.

Next, the case in which the FAX 101 transmits image information to the IFAX 106, 107 and PC 108, 109 using IFAX 104 as a repeater is described. First, the FAX 101 designates the telephone number of the IFAX 104 and transmits the sub-addresses of the IFAX 106, 107 and PC 108, 109, together with image information, to the IFAX 104. Upon receiving the sub-addresses and the image information, the IFAX 104 converts the received image information to the TIFF format, which is a format for PC to manage the received image information, because the received image information is facsimile data. Then, the IFAX 104 further converts the converted image information to the MIME format, which is a standard for transmitting non-text data, and transmits the MIME formatted image information to the IFAX 106, 107 and the PC 108, 109, as e-mail. As a protocol for transmission of an e-mail, TCP/IP is used.

The case in which the IFAX 111 is used as a repeater and image information is transmitted to the IFAX 113 and the PC 114, is the same as the case in which the IFAX 104 is used as a repeater.

According to another embodiment, the FAX 101 can use the IFAX 104 as a repeater and transmits image information to the IFAX 106, 107 and the PC 108, 109 via a mail server 115. In this case, the IFAX 106, 107 stores the image information received from the FAX 101 in the mail server 115. And the IFAX 106 or 107 receives image information addressed thereto by accessing the mail server 115.

As a repeater in the communication system of the embodiment mentioned above, as shown in FIG. 1, it is also possible that the PC 110 is connected to the IFAX 119 and the PC 110 is connected to the LAN 105.

Figure 2:
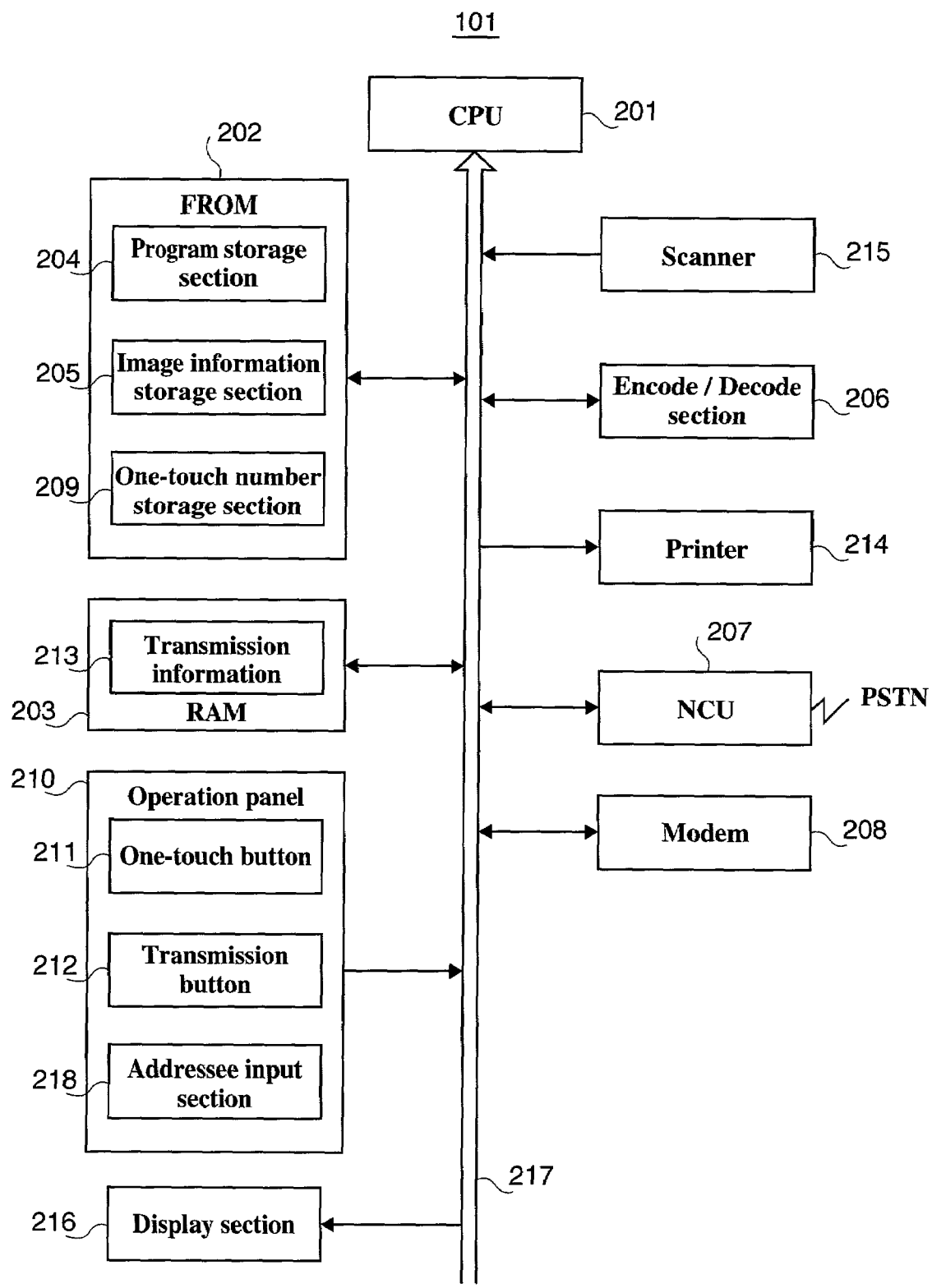
FIG. 2 is a block diagram showing hardware of a FAX of the embodiment mentioned above.

Next, hardware configuration of the FAX 101 of the embodiment mentioned above is described using FIG. 2. FIG. 2 is a block diagram of the hardware of FAX 101 of the embodiment mentioned above. A CPU 201 is provided in the FAX 101. The CPU 201 executes programs stored in a memory system and controls entire the apparatus.

As the memory system, there are FROM 202, which is a non-volatile memory, and RAM 203, which is a volatile memory.

A program storage section 204, in which various programs to be executed by the CPU 201 are stored, is provided in FROM 202. Various information, such as programs, is stored in the FROM 202. The RAM 203 is a work memory, which is a work area of the CPU 201.

An image information storage section 205 is further provided in the FROM 202. The image information storage section 205 is a storage area to store image information transmitted via any (conventional) communication system or image information to be transmitted via the communication system. The FAX 101 further includes an encode/decode section 206 that decodes an image transmitted (received) via the communication system or encodes image information to be transmitted via the communication system. Therefore, the image information stored in the image information storage section 205 is transmitted (received) image information decoded by the encode/decode section 206.

Also, a network control unit (hereinafter, referred to as NCU) 207 and a facsimile modem (hereinafter, referred to as modem) 208 are provided in the FAX 101. The NCU 207 controls transmission and reception via PSTN 102. The NCU 207 performs call processing and reception processing. A handset and an internal speaker are connected to the NCU 207. The modem 208 executes data communication and facsimile communication with another FAX via the PSTN 102.

A one-touch number storage section 209 is further provided in the FROM 202. As shown in the table (structure) of the one-touch number storage section 209 in FIG. 3, plural combinations of a one-touch number 301, an addressee (destination) 302 corresponding to the one-touch number 301, a repeater IFAX telephone number 303 corresponding to the one-touch number 301 and an addressee (destination) sub-address 304 corresponding to the one-touch number 301 are stored in the one-touch number storage section 209.

Thus, a user can transmit image information by pressing one-touch button 211 provided in the operation panel 210, in which various input sections are provided, and by pressing a transmission button 212 similarly provided in the control panel 210, without inputting address. Also, it is possible to transmit the same image information to plural different addresses (destinations) when the user presses the transmission button 212 after pressing plural one-touch buttons 211.

A user can arbitrarily set contents of the one-touch number storage section 209 by operating the operation panel 210.

The information input by the user operating the one-touch button 211 and the transmission button 212 is stored in a transmission information storage section 213. FIG. 4 is a table that shows a configuration (structure) of the transmission information storage section 213. As shown in the table shown in FIG. 4, a one-touch button number 401 pressed by a user and a sub-address 402 corresponding to the one-touch button number 401 are stored in transmission information storage section 213. When a user presses the transmission button 212 after pressing plural one-touch buttons 211, plural one-touch numbers are stored in the one-touch number area 401 and plural sub-addresses corresponding to the plural one-touch numbers are stored in the sub-address area 402. Sub-addresses to be stored in the transmission information storage section 213 are grouped by telephone numbers of IFAXes (repeaters), with reference to the one touch number storage section 209.

Thus, even if the FAX 101 has the construction including the one-touch button 211, the FAX 101 can group sub-addresses corresponding to the pressed one-touch button 211 by repeaters (IFAXes).

In order to transmit image information without using the one-touch button 211, a user can input a desired address, including, for example, a telephone number of a repeater (IFAX) and a sub-address of an addressee (destination), by operating an addressee input section 218, such as a numerical keypad, which is provided in the operation panel 210.

The FAX 101 also includes a print section 214, which is any (conventional) recording system for printing out image information transmitted (received) via communication system, and a scanning section 215, which is any (conventional) scanning system in order to scan image information from an original to be transmitted via communication system. The FAX 101 also includes a display section 216, which displays various kinds of information visually. Thus, a user can confirm the status of various kinds of input and the status of processing.

The CPU 201, the FROM 202, the RAM 203, the encode/decode section 206, the NCU 207, the modem 208, the operation panel 210, the print section 214, the scanning section 215, and the display section 216 are connected to a system bus 217, which enables them to communicate various kinds of information therebetween.

Figure 5:
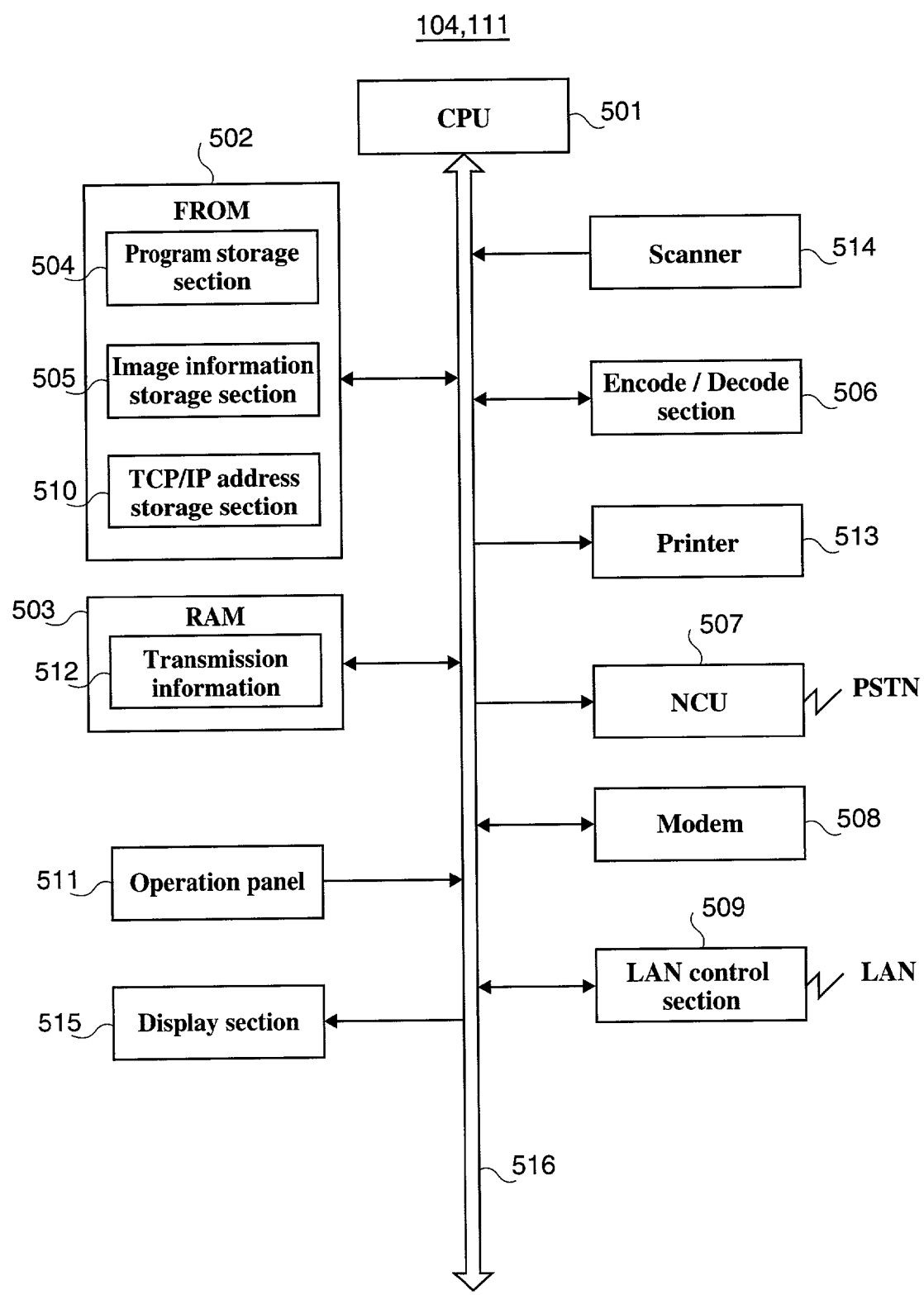
FIG. 5 is a block diagram of hardware of an IFAX of the embodiment mentioned above.

Next, hardware configuration of the IFAX 104 (111) of the embodiment mentioned above is described using FIG. 5. FIG. 5 is a block diagram of the hardware of the IFAX of the embodiment mentioned above.

A CPU 501 is provided in the IFAX 104 (111). The CPU 501 executes programs stored in a memory system and controls entire the apparatus.

As the memory system, a non-volatile memory FROM 502 and a volatile memory RAM 503 are used. A program storage section 504 is provided in the FROM 502 in which various kinds of programs are stored for the CPU 501 to execute. Various kinds of information, such as programs, are stored in the FROM 502. The RAM 503 is a work memory, which is a work area for the CPU 501.

The FROM 502 is also provided with an image information storage section 505. The image information storage section 505 is an area in which image information transmitted (received) via communication system and image information to be transmitted via communication system are stored. The IFAX 104 (111) has an encode/decode section 506 that encodes image information to be transmitted through the communication system and/or decodes image information transmitted (received) through the communication system. Therefore, the image information stored in the image information storage section 505 is transmitted (received) information after decoded by the encode/decode section 506.

The IFAX 104 (111) also includes a network control section (hereinafter, referred to as NCU) 507 and a facsimile modem (hereinafter, referred to as modem) 508. The NCU 507 controls communication of signals via the PSTN 102 (FIG. 1). The NCU 507 performs call processing and reception processing. A handset and an internal speaker are connected to the NCU 507. The modem 508 executes data communication and facsimile communication of image information, a sub-address, and so on, with another FAX via PSTN 102.

The IFAX 104 (111) also includes a LAN control section 509 as the communication system. The LAN control section 509 is connected to the LAN 105 (FIG. 1) via a router, etc., which is not shown in the drawing. The LAN control section 509 executes procedures necessary for communicating (transmitting/receiving) data with (to/from) another information terminal via the LAN 105. Thus, the IFAX 104 (111) can execute data communication of image information by e-mails with another IFAX and/or PC.

As mentioned above, the IFAX 104 (111) can work as a repeater that transfers image information of facsimile communication transmitted from the FAX 101 as an e-mail, because it has the NCU 507 and the modem 508, which are necessary for facsimile communication, and the LAN control section 509, which is necessary for e-mail communication.

Further, the FROM 502 includes a TCP/IP address storage section 510. FIG. 6 shows a configuration (structure) of the TCP/IP address storage section 510. As shown in FIG. 6, plural sets of a sub-address 601, an addressee 602 corresponding to the sub-address 601, and a TCP/IP address 603 corresponding to the sub-address are stored in the TCP/IP address storage section 510. Using this information, it is possible to transmit image information to an appropriate addressee, because the TCP/IP address corresponding to the sub-address transmitted from the FAX 101 can be determined reliably. Even when plural sub-addresses are transmitted from the FAX 101, the IFAX 104 (111) can transmit the same image information to plural different addressees (destinations) corresponding to the plural sub-addresses.

Further, a user can arbitrarily set up the contents stored in the TCP/IP address storage section 510 by operating the operation panel 511.

Further, transmission information corresponding to a sub-address transmitted from the FAX 101 is stored in a transmission information storage section 512 of the RAM 503. FIG. 7 is a table that shows the configuration (structure) of the transmission information storage section 512.

As seen in the table shown in FIG. 7, plural sets of a sub-address 701 transmitted (received) from the FAX 101 and a TCP/IP address 702 corresponding to the sub-address 701 are stored in the transmission information storage section 512. As seen in the table, when plural sub-addresses are transmitted from the FAX 101, plural sub-addresses are stored in the area of the sub-address 701 and plural TCP/IP addresses corresponding to the sub-addresses are stored in the area of the TCP/IP address 702. Thus, even when plural sub-addresses are transmitted from FAX 101, the IFAX 104 (111) can transmit image information to plural addressees appropriately by referring to the TCP/IP address storage section 510, analyzing the (obtained) TCP/IP addresses corresponding to the transmitted sub-addresses, and storing the (obtained) TCP/IP addresses in the transmission information storage section 512.

The IFAX 104 (111) also includes a print section 513, which is any (conventional) printing system for printing image information transmitted via communication system and a scanning section 514, which is any (conventional) scanning system for scanning image information to be transmitted via the communication system. Further, the IFAX 104 (111) includes a display section 515 for displaying various kinds of information visibly. With this, users can confirm the status of various inputs and the status of processing reliably.

Further, the CPU 501, the FROM 502, the RAM 503, the encode/decode section 506, the NCU 507, the modem 508, the LAN control section 509, the operation panel 511, the print section 513, the scanning section 514 and the display section 515 are connected with a system bus 516 and are enabled to communicate various kinds of information.

The FAX 101 of the present invention can transmit plural sub-addresses to the IFAX 104 (111) in a single communication transaction in the case that the same image information is transmitted to several places of the IFAXes 106, 107, and the PCs 108, 109 via the IFAX 104 as mentioned above, or in the case that the same image information is transmitted to several places of IFAX 113 and PC 114 via IFAX 111. On the other hand, a conventional facsimile apparatus can transmit only one sub-address to a repeater (IFAX) in a single communication transaction. Therefore, it is necessary for the conventional facsimile apparatus to transmit the same image information to the same repeater multiple times after connecting to the same repeater multiple times, even when the same image information is sent to plural receiver terminals via the same repeater (IFAX).

Figure 8:
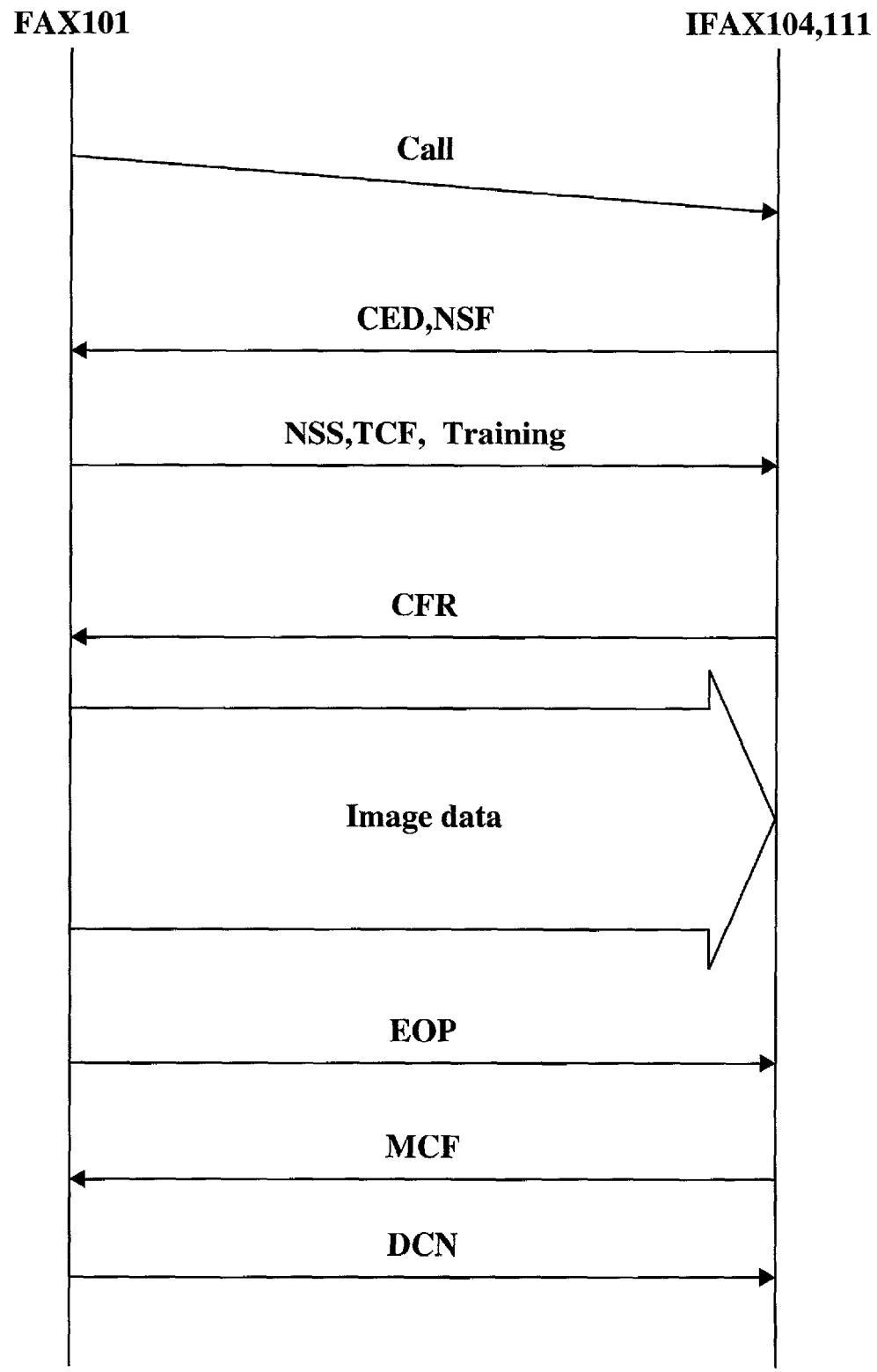
FIG. 8 is a sequential chart of communication procedure between the FAX and the IFAX of the embodiment mentioned above.

Hereinafter, communication procedures between the FAX 101 and the IFAX 104 (111) are described using FIG. 8. FIG. 8 is a sequence chart illustrating communication procedures between the FAX and the IFAX of the embodiment mentioned above.

First, the FAX 101 calls the IFAX 104 (111). In response to the call, the IFAX 104 (111) transmits a CED, which is a signal indicating that the IFAX 104 (111) is connected to a transmission line, and a NSF, which is a signal indicating that the IFAX 104 (111) is an apparatus with a non-standard function. Here, the IFAX 104 (111) transmits information that it has a function to receive plural sub-addresses in a single communication transaction to the FAX 101 as a part of the NSF.

Figure 9:
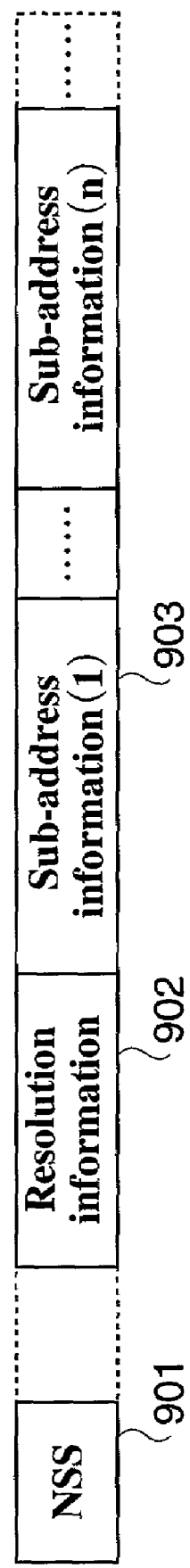
FIG. 9 is a configuration (data structure) of a NSS signal transmitted by the FAX of the embodiment mentioned above.

Then, upon receiving the NSF including the information mentioned above from the IFAX 104 (111), the FAX 101 transmits non-standard setting information to the IFAX 104 (111), as a NSS. The non-standard setting information transmitted as NSS is shown in FIG. 9. More specifically, FIG. 9 shows a data structure of an NSS signal transmitted from the FAX 101 of the embodiment mentioned above.

As shown in the figure, following to a signal 901, indicating that the coming signal is a NSS, resolution information 902 of image information and sub-address information 903 are stored. When the FAX 101 transmits a plurality of sub-address information to the IFAX 104 (111), plural sub-addresses are stored (included) in the sub-address information 903.

Thus, by receiving the NSF including information mentioned above from the IFAX 104 (111), the FAX 101 can transmit plural sub-addresses to the IFAX 104 (111), as the NSS signal.

On the other hand, in the procedures of conventional facsimile apparatus, the FAX 101 transmits a DCS carrying standard setting and a SUB carrying a single sub-address, instead of the NSS. The FAX 101 can transmit only one SUB after DCS. Thus, only one sub-address can be transmitted in a single communication transaction.

In FIG. 9, the resolution information 902 was stored together with the sub-address information 903. However, other information besides (in addition to) resolution information 902 can be stored in the NSS signal.

The FAX 101 further transmits a TCF, which is a signal for a training check, and training information together with the NSS to the IFAX 104 (111).

In response thereto, the IFAX 104 (111) transmits a CFR, which is a signal indicating that the IFAX is ready for reception, to the FAX 101 after the end of training. Upon receiving the CFR, the FAX 101 transmits image information (data) to the IFAX 104 (111). After the transmission of image information, the FAX 101 transmits an EOP, which is a signal indicating the end of image information transmission. In response thereto, the IFAX 104 (111) transmits a MCF, which is a signal indicating correct (normal) reception of image information, to the FAX 101. Upon receiving the MCF, the FAX 101 transmits a DCN, which is an order (command) to disconnect the line, and entire the communication procedure is complete.

Thus, it is possible for the FAX 101 to transmit plural sub-addresses and image information to the IFAX 104 (111) in a single communication transaction, because in the present embodiment, it is possible to transmit plural sub-addresses of receiver terminals in the NSS signal together with image information. Therefore, it is not necessary for the FAX 101 to transmit a sub-address of a receiver terminal and image information to the IFAX 104 (111) multiple times after line-connecting multiple times to the IFAX (i.e. repeater) 104 (111).

Figure 10:
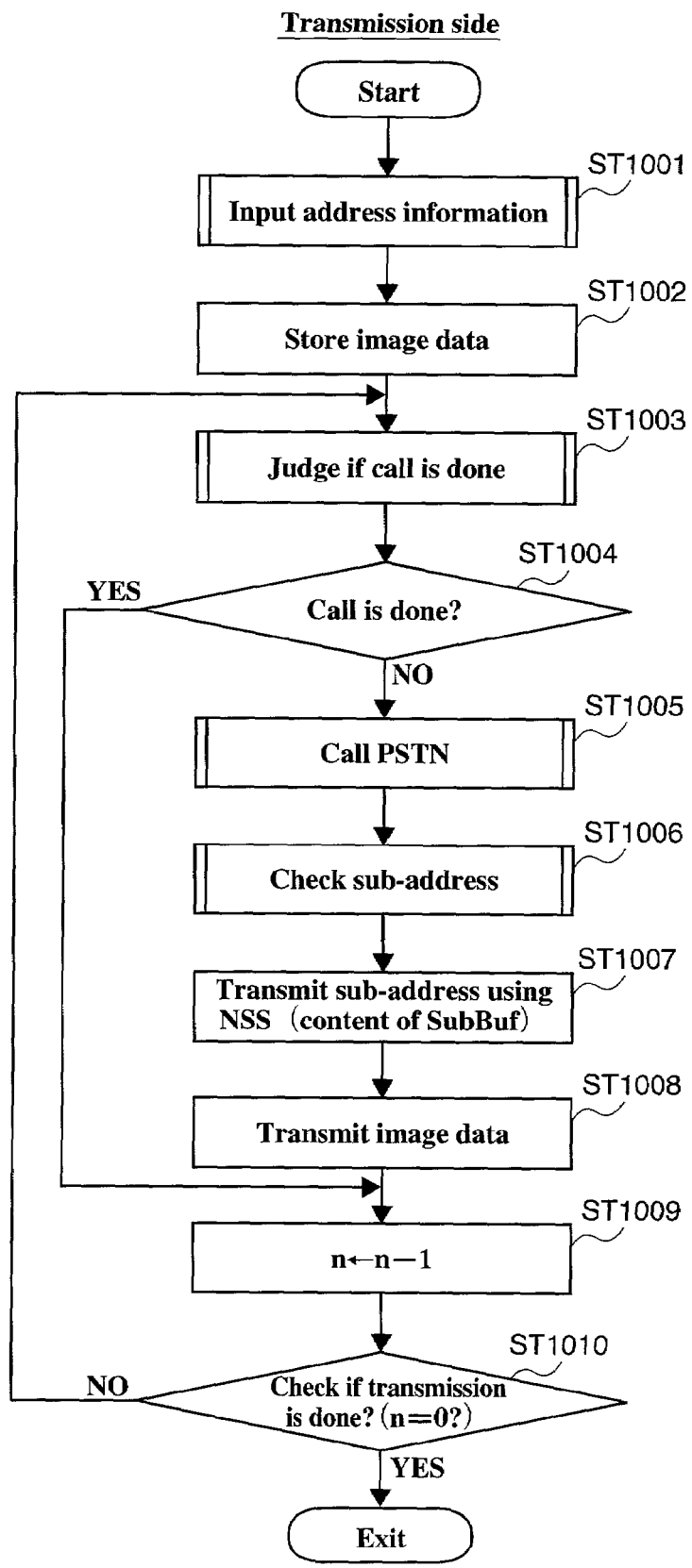
FIG. 10 is a flowchart showing an operation of image information transmission from the FAX of the embodiment mentioned above.
Figure 11:
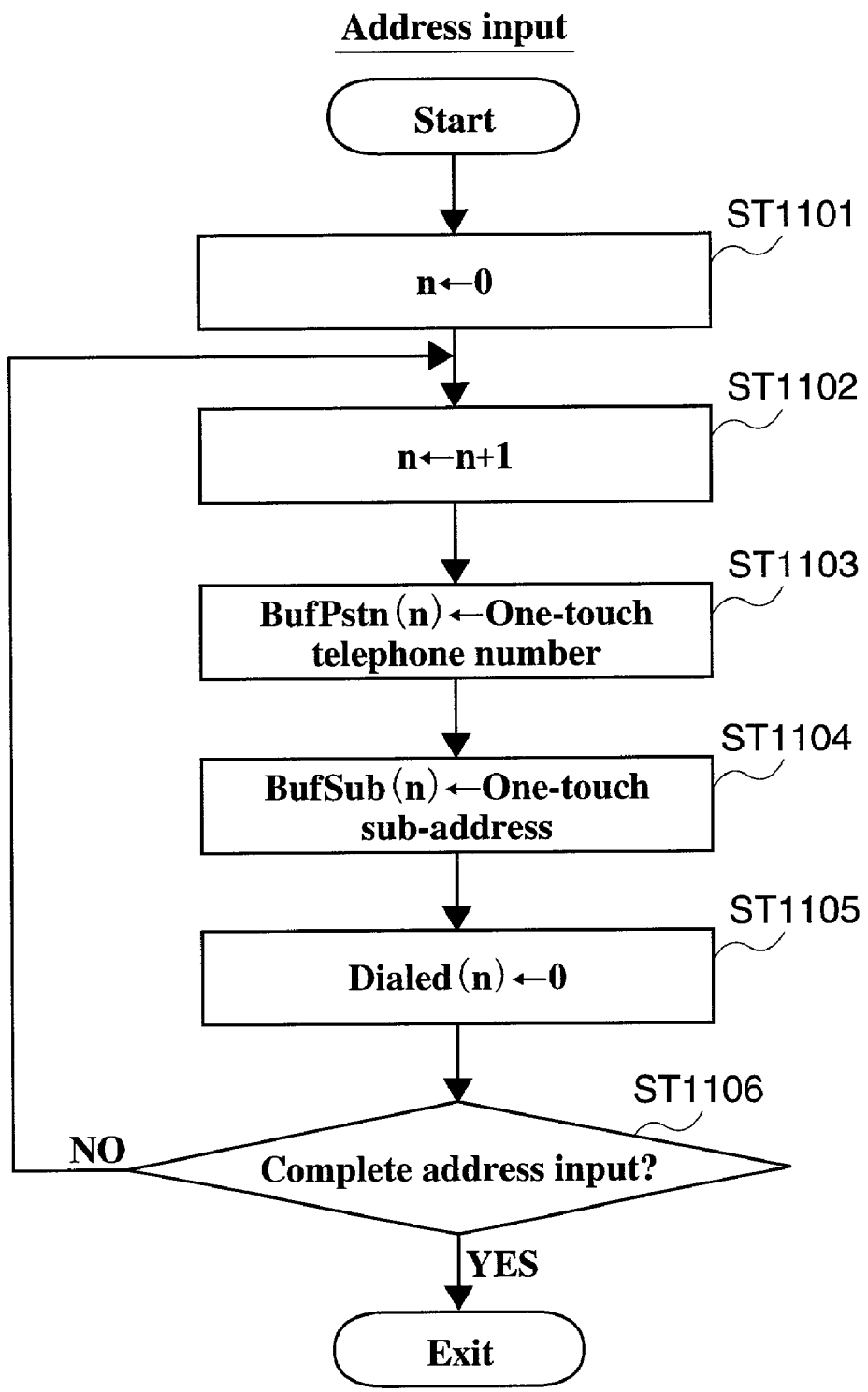
FIG. 11 is a flowchart showing an address input operation when image information is transmitted from the FAX of the embodiment mentioned above.
Figure 12:
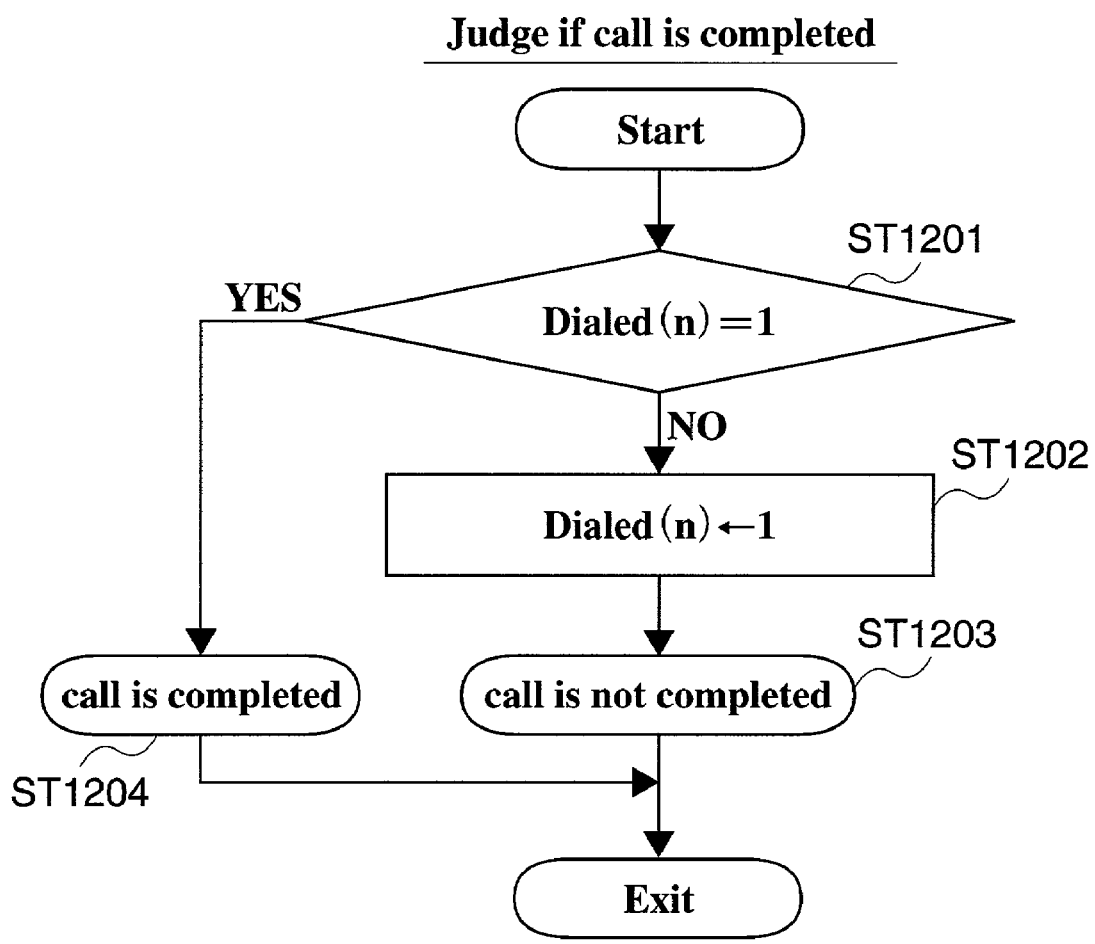
FIG. 12 is a flowchart showing a call (completion) check operation when image information is transmitted from the FAX of the embodiment mentioned above.
Figure 13:
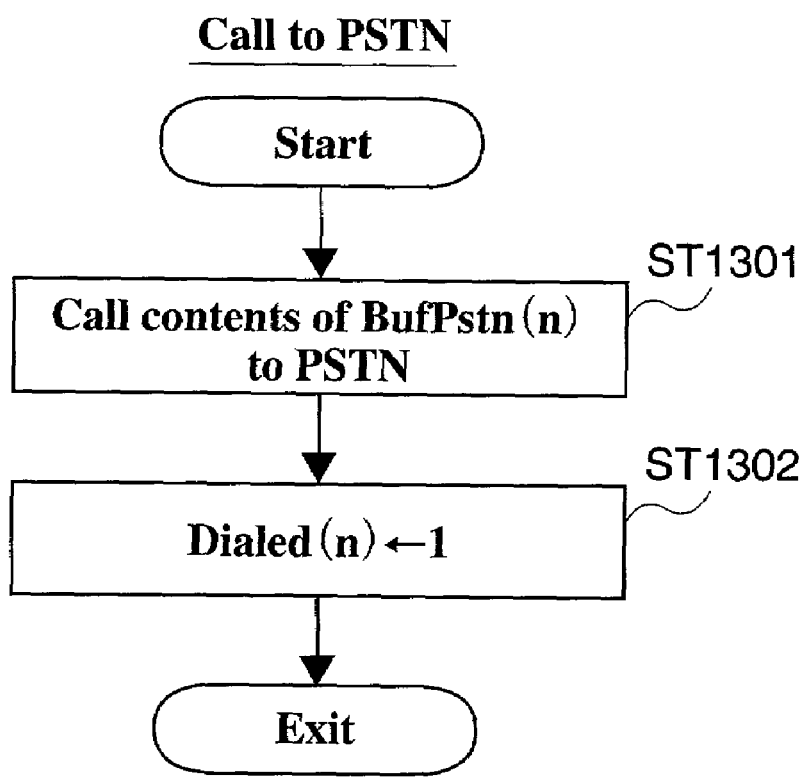
FIG. 13 is a flowchart showing a call operation for PSTN, when image information is transmitted from the FAX of the embodiment mentioned above.
Figure 14:
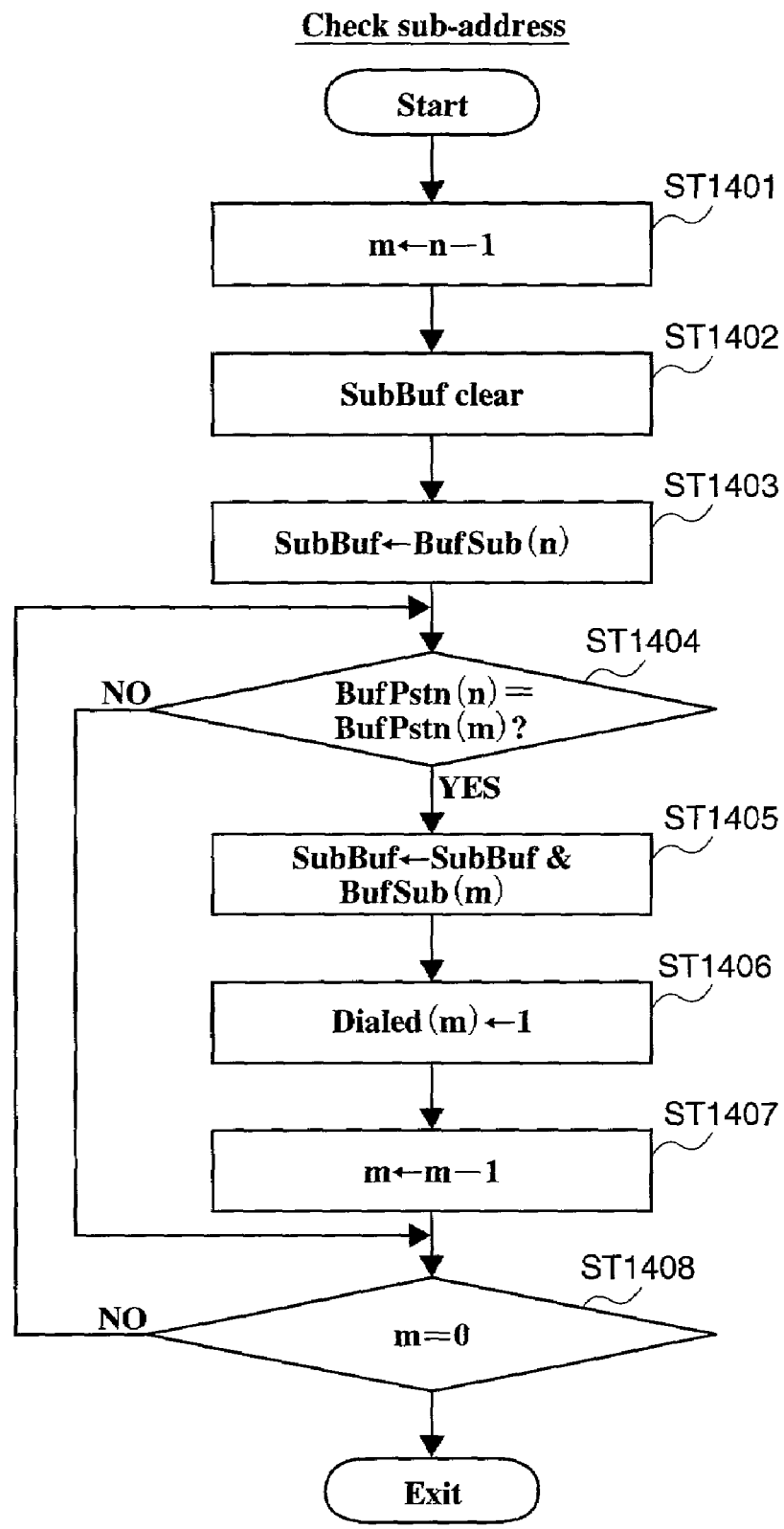
FIG. 14 is a flowchart showing a sub-address check operation when image information is transmitted from the FAX of the embodiment mentioned above.

Next, the operation performed when the FAX 101 transmits image information is described in detail using flowcharts shown in FIG. 10 through FIG. 14. FIG. 10 is a flowchart of an operation when the FAX 101 of the above-mentioned embodiment transmits image information. FIG. 11 is a flowchart that shows an address input operation when the FAX 101 transmits image information. FIG. 12 is a flowchart that shows a call (completion) check operation when the FAX 101 of the embodiment mentioned above transmits image information. FIG. 13 is a flowchart that shows a call operation to the PSTN when the FAX 101 of the embodiment mentioned above transmits image information. FIG. 14 is a flowchart that shows a sub-address check operation when the FAX 101 of the embodiment mentioned above transmits image information.

First, address information is input to the FAX 101 by a user operating the one-touch button 211 of the operation panel 210. Then, the FAX 101 proceeds to an operation in which the FAX 101 inputs (stores) the address information into the address information storage section (hereinafter referred to as SubBuf) 213 of the RAM 203 (ST1001). Here, the operation in which the FAX 101 inputs (stores) address information into the SubBuf of RAM 203 is described using FIG. 11.

Before the operation of inputting (storing) address information to the SubBuf 213, BufPstn(n), which is a buffer for temporary storage of a one-touch number, BufSub(n), which is a buffer for temporary storage of a sub-address corresponding to the one-touch number, and Dialed(n), which is a flag indicating a call-completion, are prepared in RAM 203, which is a work area. When the Dialed(n) is equal to 1, it means a call has been finished. Here, "n" is a natural number and is a valuable corresponding to the order that one-touch buttons 211 are pressed.

SubBuf 213, BufPstn(n), BufSub(n) and Dialed(n) can be provided in the work area inside of the CPU 201.

Next, the FAX 101 initializes BufPstn, Bufsub and Dialed by setting n in the parenthesis described above to be 0 (ST1101). Then, by adding 1 to n, n is incremented by 1 (ST1102).

Then, the FAX 101 inputs (stores) a telephone number 303, corresponding to the one-touch button 211 pressed by a user, to BufPstn(n), i.e., in the first step, to BufPstn(1), by referring to the one-touch number storage section 209 in the FROM 202 (ST1103). The FAX 101 inputs (stores) the sub-address 304, corresponding to the one-touch button 211 pressed by a user, into BufSub(n), i.e., in the first step, into BufSub(1), by referring to the one-touch number storage section 209 in the FROM 202. Then, the FAX 101 inputs (stores) 0 into Dialed(n), i.e., into the first step, to Dialed(1), since the information about the one-touch button that was pressed first has not yet transmitted (ST1105).

Next, the FAX 101 determines whether an address input operation has been completed by checking whether all the information corresponding to the one-touch button 211 pressed by a user is input (stored), or by checking whether the transmission button 212 is pressed (ST1106). In ST1106, when the address input operation is not completed, the control returns to ST1102 to increment n, and address information corresponding to the one-touch button 211 that has not been input (stored) yet is input (stored). Procedures from ST1102 to ST1106 are repeated until all address information, corresponding to all the pressed one-touch buttons, is input (stored).

Thus, the FAX 101 can input address information corresponding to one-touch buttons pressed by the user to BufPstn(n), BufSub(n), and Dialed(n) by referring to the one-touch number storage section 209.

After completing the input (storing) of address information corresponding to the pressed one-touch buttons, the FAX 101 starts scanning an original by the scanning section 215 and stores the image information of the scanned image to the image information storage section 205 (ST1002) (FIG. 10).

Next, the FAX 101 checks whether a call is finished (completed) to the address corresponding to the pressed one-touch button 211 (ST1003). A call completion check of the FAX 101 will be described hereinafter in detail using FIG. 12.

First, the FAX 101 determines whether a call has been completed for the information corresponding to the pressed one-touch buttons 211 by checking whether the Dialed(n) is 1. When the FAX 101 first executes ST1201, as described in FIG. 11, n is incremented and is the same as the number of the pressed one-touch buttons 211. Therefore, Dialed(n) is the information regarding the addressee (destination) corresponding to the one-touch button that is pressed at the n-th time, in other words, at the last time. When the FAX 101 determines that Dialed(n) is not 1 in ST1201, then 1 is input to Dialed(n), since the FAX 101 will subsequently perform call processing for the address corresponding to the one-touch button pressed at the n-th time (ST1202). Then, the FAX 101 goes to the call processing for the address of one-touch button pressed at the n-th time. On the other hand, when the FAX 101 determines that Dialed(n) is 1 in ST1201, the FAX 101 determines that call processing has been completed for the address corresponding to the one-touch button 211 pressed at the n-th time and proceeds to the next process (ST1204).

Thus, by the FAX 101 checking whether Dialed(n) is 1, it can be determined whether the call processing for the address corresponding to the pressed one-touch button 211 has been performed (completed).

From the result of the determination (check) in ST1003, the FAX 101 determines whether call processing for the address corresponding to the one-touch button 211 pressed at the n-th time has been performed (completed) (ST1004). When the FAX 101 determines that call processing for the address corresponding to the one-touch button 211 pressed at the n-th time has been performed (completed), the FAX 101 goes to ST1009, which will be described later, since it is not necessary to call the telephone number of the repeater corresponding to the one-touch button 211 pressed at the n-th time.

On the other hand, when the FAX 101 determines that call processing for the address corresponding to the one-touch button 211 pressed at the n-th time has not been performed (completed), the FAX 101 goes to a process to call the address corresponding to the one-touch button 211 pressed at the n-th time via the PSTN 102 (ST1005). Here, the process in which the FAX 101 calls the address corresponding to the one-touch button 211 pressed at the n-th time via PSTN is described in detail using FIG. 13.

First, the FAX 101 performs call processing for the contents of BufPstn(n), in other words, for the telephone number of the repeater (i.e. IFAX 104 and/or 111) via the PSTN 102 (ST1301). As shown in FIG. 11, n is incremented and is the same as the number of the pressed one-touch buttons 211, when the FAX 101 first processes ST1301. In other words, BufPstn(n) indicates the information regarding the address corresponding to the one-touch button 211 pressed last.

After calling the address corresponding to the one-touch button 211 pressed at the n-th time, one (1) is input to Dialed(n) (ST1302). Although Dialed(n) has been set to 1 in ST1202, it is possible to more reliably determine the completion of the call for the one-touch button 211 pressed at the n-th time by again inputting 1 (one) to Dialed(n).

Then, the FAX 101 goes to the process to check the telephone number of an IFAX as a repeater that corresponds to the pressed one-touch button 211 (ST1006). Here, the sub-address check operation by the FAX 101 is described in detail using FIG. 14.

First, the FAX 101 obtains m from the relation m=n−1 (ST1401). Here, m indicates the number of addresses that are not processed among the number of addresses designated by one-touch buttons 211. Then, SubBuf213 is initialized by clearing the contents thereof (ST1402). The sub-address corresponding to the one-touch button 211 pressed at the n-th time is stored in the sub-address storing area 402 in the initialized SubBuf213 (ST1403).

Then, the FAX 101 goes to the operation to check whether, among repeaters corresponding to all the pressed one-touch buttons 211, there is a repeater that has the telephone number the same as that of the repeater corresponding to the one-touch button 211 pressed at the n-th time. Note that, when the information regarding the one-touch button 211 pressed last is processed, other information has not been input (stored) to SubBuf 213. Therefore, the telephone number the same as the telephone number of the repeater corresponding to the one-touch button 211 pressed last is not stored obviously (inherently).

When there is a repeater that has the same telephone number as that of the repeater corresponding to the one-touch button 211 pressed at the n-th time among the repeaters corresponding to all the pressed one-touch buttons 211, the FAX 101 goes to the operation to store the sub-address of the destination corresponding to the one-touch button 211 pressed at the m-th time, which uses the same repeater, to the sub-address storing area of the SubBuf 213. In other words, the process performed by the FAX 101 is grouping of sub-addresses of addressees (destinations) by repeaters.

More specifically, the FAX 101 checks whether the content of BufPstn(n) and that of BufPstn(m) are the same, in order to determine whether a telephone number of the repeater corresponding to the one-touch button 211 pressed at the n-th time is the same as the telephone number of a repeater corresponding to another one-touch button 211 (ST1404). Then, when the FAX 101 determines that the content of BufPstn(m) is the same as that of BufPstn(n) in ST1404, the FAX 101 stores the sub-address corresponding to the one-touch button 211 pressed at the m-th time into the area associated with the telephone number of the repeater that corresponds to the one-touch button 211 pressed at the n-th time, which is already stored in SubBuf 213 (ST1405).

The sub-address corresponding to the one-touch button 211 pressed at the m-th time and the sub-address corresponding to the one-touch button 211 pressed at the n-th time are grouped together and are simultaneously transmitted to the repeater corresponding to the one-touch button 211 pressed at the n-th time. Accordingly, in order not to repeat the processing regarding the sub-address corresponding to the one-touch button 211 pressed at the m-th time, 1 (one) is input to Dialed(m) (ST1406).

Then, m is decremented by subtracting 1 from m to check whether there is a telephone number the same as that of the repeater corresponding to the one-touch button 211 pressed at the n-th time among the telephone numbers of repeaters corresponding to the other pressed one-touch buttons 211 (ST1407). It is checked whether m is equal to 0 (m=0) to determine whether the comparison of the telephone number corresponding to the one-touch button 211 pressed at the n-th time with all the telephone numbers corresponding to all the pressed one-touch buttons 211 has been finished (ST1408). The processes from ST1404 to ST1408 are repeated until m becomes 0 to check whether there is a telephone number the same as that of the repeater corresponding to the one-touch button 211 pressed at the n-th time among the telephone numbers of repeaters corresponding to all the pressed one-touch buttons 211.

Thus, it is possible to check whether there is a telephone number that is the same as that of the repeater corresponding to the one-touch button 211 pressed at the n-th time. Thus, sub-addresses corresponding to the pressed one-touch buttons 211 can be grouped by repeaters.

Next, the FAX 101 transmits sub-addresses that are grouped together in ST1006 and that use the repeater corresponding to the one-touch button 211 pressed at n-th time, using NSS signal (ST1007).

Then, the FAX 101 transmits image information of the originals stored in the image information storage section 205 to the repeater corresponding to the one-touch button 211 pressed at the n-th time (ST1008). Thereafter, the FAX 101 decrements n by 1 in order to perform the process mentioned above for all the pressed one-touch buttons 211 (ST1009). Then, the FAX 101 checks whether n is equal to 0 in order to transmit the information (sub-addresses) regarding all the pressed one-touch buttons 211 to repeaters (i.e., IFAXes) (ST1010). The FAX 101 repeats the processes from ST1003 to ST1010 until n becomes 0.

Thus, the FAX 101 can group sub-addresses of the addressees (destinations) corresponding to the pressed one-touch buttons 211 by repeaters to be used, and can transmit the grouped plural sub-addresses at once to each of the repeaters. Thus, the FAX 101 can realize efficient communication by reducing number of calls for repeaters.

Figure 15:
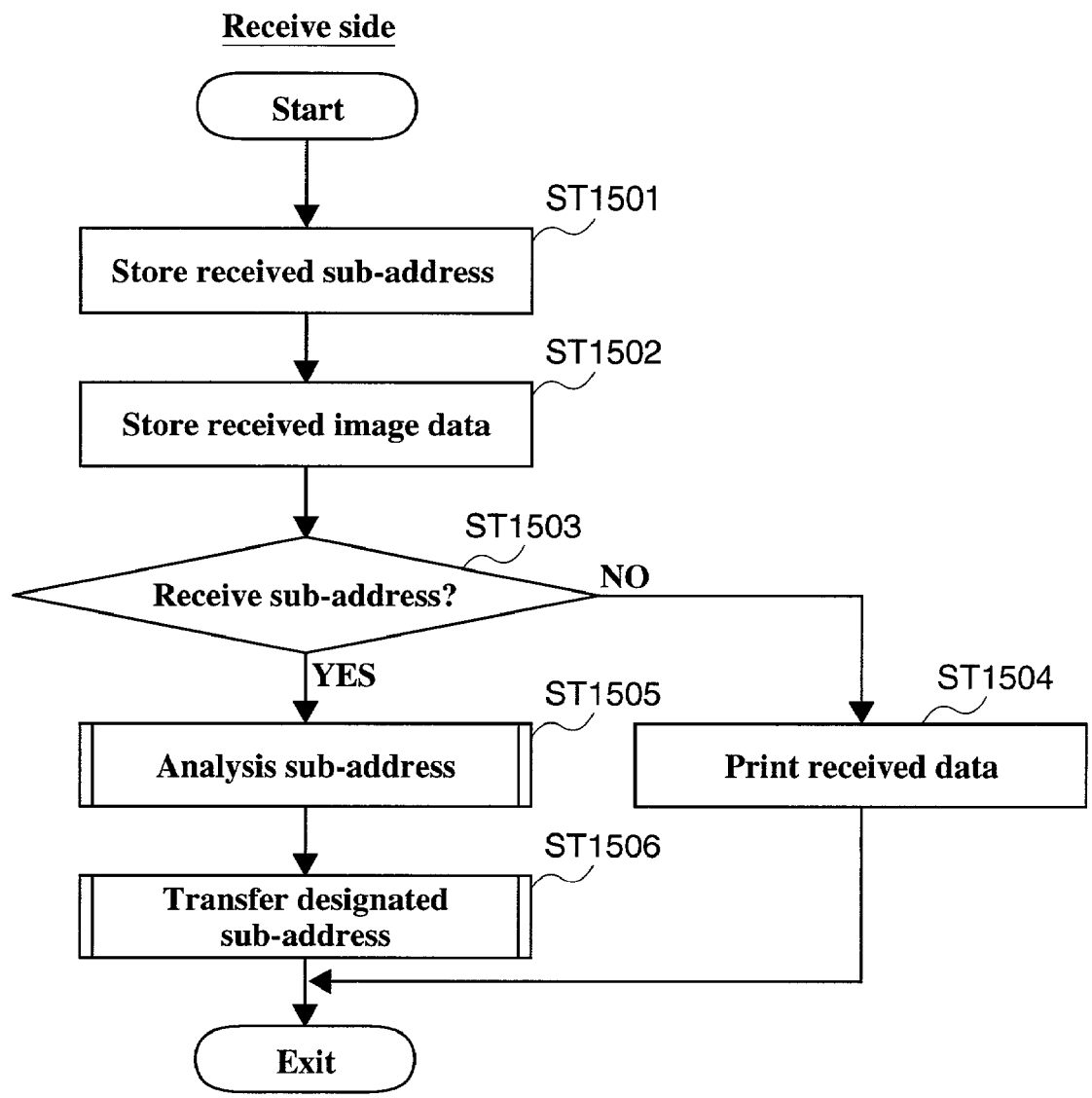
FIG. 15 is a flowchart showing an operation when image information is transferred by the IFAX of the embodiment mentioned above.
Figure 16:
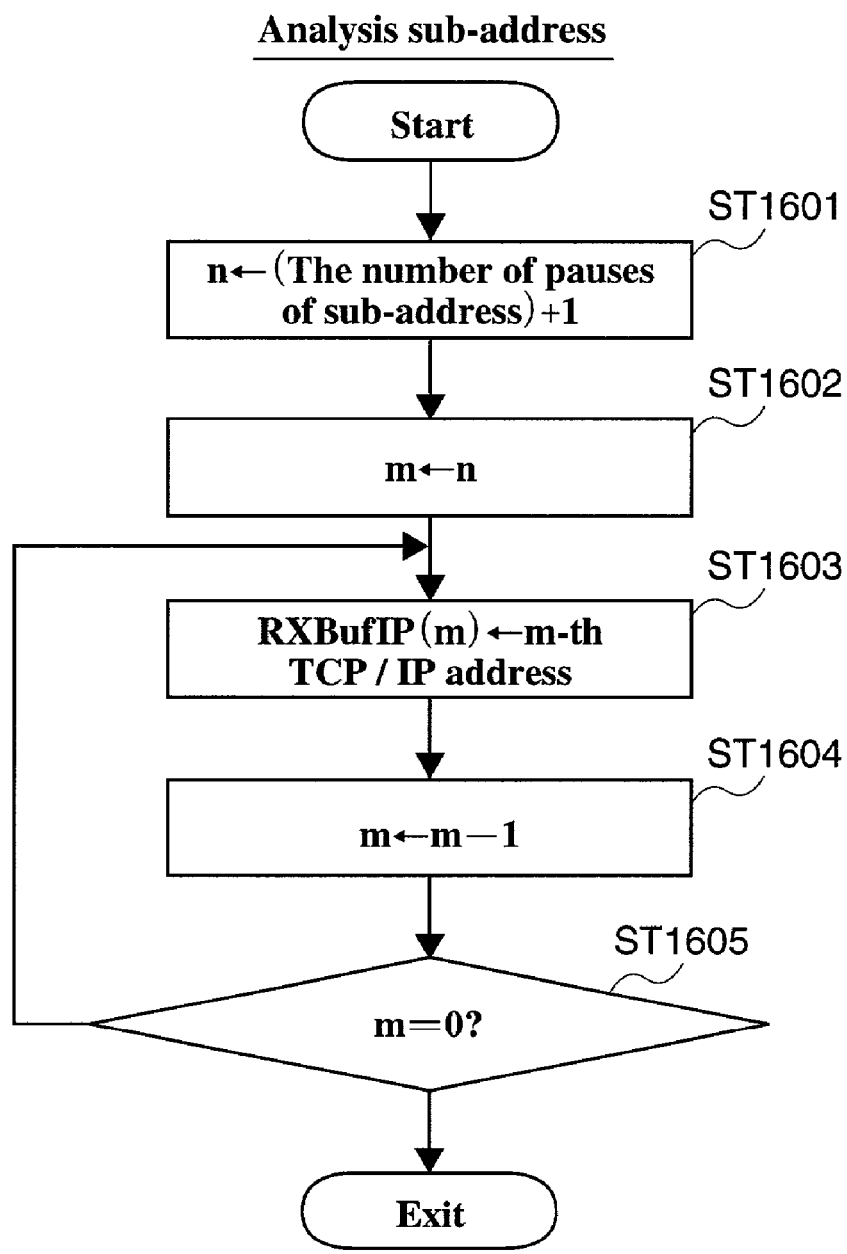
FIG. 16 is a flowchart showing a sub-address analysis operation, when image information is transferred from the IFAX of the embodiment mentioned above.
Figure 17:
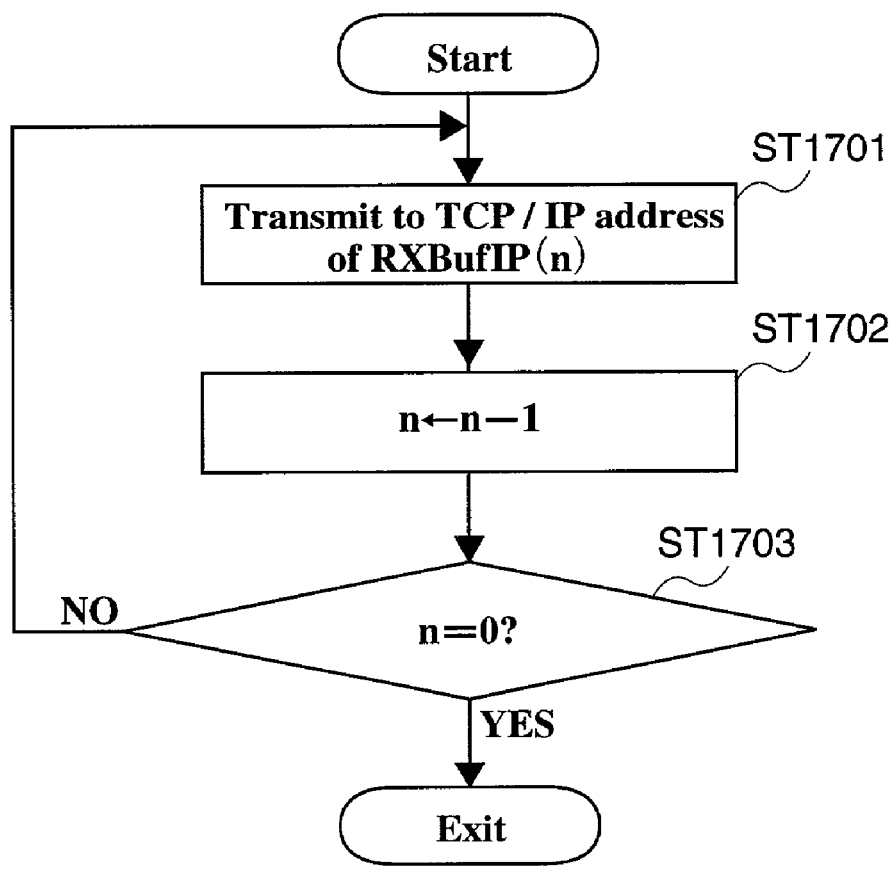
FIG. 17 is a flowchart showing an operation to transfer image information to a designated address, when the image information is transferred from the IFAX of the embodiment mentioned above.

Next, an operation of the IFAX 104 (111) as a repeater, at the time of image information transmission is described in detail using flowcharts shown in FIG. 15 through FIG. 17. FIG. 15 is a flowchart that shows an operation of the IFAX according to the above-mentioned embodiment, when the IFAX transfers image information. FIG. 16 is a flowchart that shows a sub-address analysis operation by the IFAX according to the above-mentioned embodiment, when the IFAX transfers image information. FIG. 17 is a flowchart that shows an operation when the IFAX of the above-mentioned embodiment transfers image information to designated addresses.

After establishing connection with the FAX 101, upon receiving sub-addresses from the FAX 101, the IFAX 104 (111) stores received sub-addresses into the sub-address storage area (hereinafter referred to as RXBufSub(n)) 701 in the transmission information storage section (hereinafter, referred to as RXSubBuf) 512 in the order of reception as shown in FIG. 7. The number in the parenthesis in FIG. 7 indicates "n", i.e., the order of reception.

Then, the IFAX 104 (111) stores the received image information to the image information storage section 505 (ST1502). Thus, the IFAX 104 (111) checks whether a sub-address is received, because the process is different depending upon whether a sub-address is received (ST1503). When the IFAX 104 (111) determines that a sub-address is not received in ST1503, the IFAX 104 (111) prints the received image information at the print section 513, because the received image information is not the image information requested for transfer, but is addressed to the IFAX 104 (111) itself (ST1504).

On the other hand, when the IFAX 104 (111) determines that a sub-address is received in ST1503, it is necessary to transfer the received image information to the sub-address. Accordingly, the IFAX 104 (111) proceeds to an image information transfer process.

When the IFAX 104 (111) proceeds to the image information transfer process, the IFAX 104 (111) executes an analysis process for the received sub-address (ST1505). Here, the sub-address analysis process is described in detail using FIG. 16.

In the sub-address analysis process, the IFAX 104 (111) substitutes the number of punctuations, such as "/", in the received sub-addresses, plus 1 for variable n (ST1601). Here, variable n is the number of sub-addresses received. Then, the variable n is substituted for variable m (ST1602).

Then, the IFAX 104 (111) refers to the TCP/IP address storage section 510 shown in FIG. 6 to obtain a TCP/IP address corresponding to the sub-address stored in RXBufSub(m) 701, and stores the TCP/IP address to the m-th area of the TCP/IP address storage area 702 (hereinafter, referred to as RXBufIP(n)) in RXSubBuf 512 (ST1603). Then, the IFAX 104 (111) decrements m by 1 in order to store TCP/IP addresses corresponding to all the received sub-addresses to RXBufIP(n) 702 (ST1604). In order to check whether the TCP/IP addresses corresponding to all the received sub-addresses have been stored into RXBufIP(n), the IFAX 104 (111) checks whether m is equal to 0 (ST1605). Then, the processes from ST1603 to ST1605 are repeated until m becomes 0 in order for the TCP/IP addresses corresponding to all the received sub-addresses to be stored into RXBufIP (n).

Thus, the IFAX 104 (111) can analyze (obtain) the TCP/IP addresses of all the received sub-addresses by referring to the TCP/IP address storage section 510.

After storing the TCP/IP addresses corresponding to all the received sub-addresses into RXBufIP(n), the IFAX 104 (111) executes a transfer process of image information to the TCP/IP addresses stored in RXBufIP(n) (ST1506). Here, the process for transferring image information to TCP/IP addresses stored in RXBufIP(n) is described in detail using FIG. 17.

Upon proceeding to the image information transfer process, the IFAX 104 (111) obtains z TCP/IP address from RXBufIP(n) and transmit the image information stored in the image information storage section 505 to the TCP/IP addresses (ST1701). Then, the IFAX 104 (111) decrements n by 1 in order for the IFAX 104 (111) to transfer image information to the TCP/IP addresses corresponding to all the received sub-addresses (ST1702). In order to determine whether transfer of image information to all the received sub-addresses is complete, the IFAX 104 (111) checks whether the decremented n is equal to 0 (ST1703). Processes from ST1701 to ST1703 are repeated until the completion of transfer of image information to all the sub-addresses that the IFAX 104 (111) received. When transfer of image information to all the sub-addresses is completed, contents of the image information storage section 505 are erased and the process is completed.

Thus, even when plural sub-addresses are received in a single communication transaction, the IFAX 104 (111) can transmit image information to receiver terminals having the received sub-addresses, since the IFAX 104 (111) can obtain a TCP/IP address for each of the received sub-addresses.

It is also possible that the IFAX 104 (111) has an e-mail address storage section in which sub-addresses and e-mail addresses corresponding to the sub-addresses are stored as shown in FIG. 18. In this configuration, the IFAX 104 (111) can transmit image information to the receiver terminals corresponding to the received sub-addresses via the mail server 115, because e-mail addresses can be obtained for each of the received sub-addresses, even when plural sub-addresses are received in a single communication transaction.

It is also possible to provide RXSubBuf 512, RXBufSub (n) 701 and RXBufIP(n) 712 in the work area of the CPU 201.

As mentioned above, when plural one-touch buttons 211 are pressed, the FAX 101 of the embodiment mentioned above can check identical telephone numbers of repeaters (i.e., IFAXes) corresponding to the pressed one-touch buttons 211. In other words, when the FAX 101 is instructed multicasting transmission, the FAX 101 can transmit sub-addresses corresponding to the pressed one-touch buttons 211 as a group, together with image information to each of repeaters. Thus, plural sub-addresses can be transmitted to a repeater in a single communication transaction. Therefore, it is not necessary to transmit the same image information multiple times to a repeater. Thus, the FAX 101 can realize high communication efficiency by the reduction of the number of calls to the IFAX 104 (111). As the result, communication cost can be reduced.

In the embodiment mentioned above, input sub-addresses can be grouped by telephone numbers of repeaters, when the telephone numbers of the plural repeaters are input. Even in the case that the telephone numbers of plural repeaters are input, input plural sub-addresses are grouped by repeaters. Thus, efficient communication is realized, since sub-addresses are transmitted to appropriate repeaters.

In the embodiment mentioned above, even when the FAX 101 inputs (transmits) plural sub-addresses to a repeater, it is possible to transmit image information to receivers that have the received (transmitted) sub-addresses, since TCP/IP addresses are obtained for each of the sub-addresses that were received by a repeater.

In the embodiment mentioned above, the FAX 101 transmits sub-addresses to IFAX 104 (111). However, it is also possible that the FAX 101 transmits TCP/IP addresses to the IFAX 104 (111) by storing TCP/IP addresses corresponding to sub-addresses in the one-touch number storing section. In this embodiment (configuration), it is not necessary for the IFAX 104 (111) to analyze (determine) TCP/IP addresses corresponding to sub-addresses. Therefore, the load of repeaters is reduced. It is also not necessary for the IFAX 104 (111) to have the TCP/IP address storage section 510. FIG. 19 shows a table of the one-touch number storage section in the modified embodiment mentioned above.

In the embodiment mentioned above, the FAX 101 transmits sub-addresses to the IFAX 104 (111). However, it is also possible that the FAX 101 transmits e-mail addresses to the IFAX 104 (111) by storing e-mail addresses corresponding to sub-addresses in the one-touch number storage section. In this embodiment, it is not necessary for the IFAX 104 (111) to analyze e-mail addresses corresponding to sub-addresses, and as a result, the load of repeaters is reduced. FIG. 20 shows a table of one-touch number storage section in the modified embodiment mentioned above.

In the embodiment mentioned above, the one-touch buttons 211 are used for inputting telephone numbers of the IFAX 104 (111), and sub-addresses of receiver terminals. However, it is also possible to input telephone numbers of IFAX 104 (111), and sub-addresses of receiver terminals without using one-touch buttons 211. For example, another input method is possible, such as a method in which, after a telephone number of IFAX 104 (111), "-" is input and then a sub-address is input.

In the embodiment mentioned above, the FAX 101 groups sub-addresses by telephone numbers of repeaters. However, it is also possible for the FAX 101 to group sub-addresses by any information that can identify repeaters. For example, it is possible to group sub-addresses by IP addresses, e-mail addresses and serial numbers of repeaters, assigned to the repeaters by users. In this case, it is necessary to store this information in the one-touch storage section, in association with each one-touch button.

As mentioned above, the present invention can realize reduction of communication cost by efficient communication.

It is noted that the foregoing examples have been provided merely for the purpose of explanation and are in no way to be construed as limiting of the present invention. While the present invention has been described with reference to certain embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

The present disclosure relates to subject matter contained in priority Japanese Application No. 2000-215823, filed on Jul. 17, 2000, which is herein expressly incorporated by reference in its entirety.

What is claimed is:

1. A facsimile apparatus transmitting image data to a relay Internet facsimile apparatus via PSTN (Public Switched Telephone Networks), the relay Internet facsimile apparatus transmitting the image data to a plurality of receiving Internet facsimile apparatuses via the Internet, each of the plurality of receiving Internet facsimile apparatuses having a sub-address and an IP address, the facsimile apparatus comprising:

an input configured to input the image data;
a panel configured to input predetermined information identifying the relay Internet facsimile apparatus and sub-addresses of the plurality of receiving Internet facsimile apparatuses, the relay Internet facsimile apparatus having a memory that stores IP addresses of the plurality of receiving Internet facsimile apparatuses corresponding to the sub-addresses of the plurality of receiving Internet facsimile apparatuses; and a controller that, when the predetermined information and the sub-addresses of the plurality of receiving Internet facsimile apparatuses are input by the panel, transmits, to the relay Internet facsimile apparatus via the PSTN, the input image data and the input sub-addresses of the plurality of receiving Internet facsimile apparatuses, based on the input predetermined information identifying the relay Internet facsimile apparatus, the relay Internet facsimile apparatus determining whether the sub-addresses of the plurality of receiving Internet facsimile apparatuses are received from the facsimile apparatus, the relay Internet facsimile apparatus converting the transmitted image data into data for Internet transmission and relaying the converted data to the plurality of the receiving Internet facsimile apparatuses via the Internet, based on the IP addresses of the plurality of receiving Internet facsimile apparatuses corresponding to the sub-addresses of the plurality of receiving Internet facsimile apparatuses stored in the memory of the relay Internet facsimile apparatus, when it is determined that the sub-addresses of the plurality of receiving Internet facsimile apparatuses are received from the facsimile apparatus, the relay Internet facsimile apparatus printing out the transmitted image data when it is determined that the sub-addresses of the plurality of receiving Internet facsimile apparatuses are not received from the facsimile apparatus.

2. The facsimile apparatus according to claim 1, wherein, when the panel inputs a plurality of the predetermined information identifying a plurality of the relay Internet facsimile apparatuses and when the plurality of the sub-addresses corresponding to each of the plurality of the predetermined information are input, the controller transmits, to the plurality of the relay Internet facsimile apparatuses, the input image data and the plurality of the sub-addresses of the receiving Internet facsimile apparatuses, based on each of the plurality of the predetermined information identifying the plurality of the relay Internet facsimile apparatuses.

3. The facsimile apparatus according to claim 1, wherein the panel includes a plurality of one-touch buttons, the predetermined information identifying the relay Internet facsimile apparatus and the plurality of the sub-addresses of the receiving Internet facsimile apparatuses being input by the plurality of the one-touch buttons.

4. The facsimile apparatus according to claim 1, wherein the controller transmits, to the relay Internet facsimile apparatus via the PSTN, the plurality of the sub-addresses of the receiving Internet facsimile apparatus using a NSS signal.

5. The facsimile apparatus according to claim 4, wherein the controller transmits, in a single transmission, the plurality of sub-addresses of the receiving Internet facsimile apparatus using an NSS, in response to the relay Internet facsimile apparatus transmitting, to the facsimile apparatus, a signal that the relay Internet facsimile apparatus is configured to receive plural sub-addresses in a single communication.

6. The facsimile apparatus according to claim 1, wherein the predetermined information comprises a telephone number of the relay Internet facsimile apparatus.

7. The facsimile apparatus according to claim 1, the memory being configured to store groups of IP addresses in association with groups of sub-addresses of the plurality of receiving Internet facsimile apparatuses, whereby converted image data can be transmitted, in a single transmission, to the group plurality of receiving Internet facsimile apparatuses based upon the group of IP addresses.

8. The facsimile apparatus according to claim 1, wherein, in response to receipt of a signal from the relay Internet facsimile apparatus that the relay Internet facsimile apparatus can receive a plurality of sub-addresses in a single communication, the controller transmits, to the relay Internet facsimile apparatus, a plurality of sub-addresses of the receiving Internet facsimile apparatuses in a single communication.

9. The facsimile apparatus according to claim 1, the controller being further configured to transmit the input sub-addresses of the plurality of receiving Internet facsimile apparatuses in a single facsimile transmission.

10. A relay Internet facsimile apparatus, comprising:
a memory configured to store a plurality of IP addresses of receiving Internet facsimile apparatuses corresponding to a plurality of sub-addresses of the receiving Internet facsimile apparatuses;
a communicator configured to receive, from a transmitting facsimile apparatus, via PSTN (Public Switched Telephone Networks), image data and the plurality of the sub-addresses of the receiving Internet facsimile apparatuses in a single facsimile transmission; and
a controller configured to determine whether the sub-addresses of the plurality of receiving Internet facsimile apparatuses are received from the transmitting facsimile apparatus,
the controller, when it is determine that the sub-addresses of the plurality of receiving Internet facsimile apparatuses are received from the transmitting facsimile apparatus, being further configured to convert the received image data into data for Internet transmission, and to relay the converted data to the plurality of the receiving Internet facsimile apparatuses via the Internet, based on the plurality of the IP addresses of the receiving Internet facsimile apparatuses corresponding to the sub-addresses of the plurality of receiving Internet facsimile apparatuses stored in the memory,
the controller, when it is determined that the sub-addresses of the plurality of receiving Internet facsimile apparatuses are not received from the transmitting facsimile apparatus, being further configured to print out the received image data.

11. The relay Internet facsimile apparatus according to claim 10, the memory being configured to store at least one group of at least two IP addresses in association with at least one group of at least two sub-addresses, whereby converted image data can be transmitted, in a single transmission, to each of the receiving internet facsimile apparatuses of a group, based upon the IP addresses of the group.

12. The relay Internet facsimile apparatus according to claim 10, said communicator being further configured to transmit, to the transmitting facsimile apparatus, a signal indicating that the relay Internet facsimile apparatus is configured to receive a plurality of sub-addresses to which image data is to be transmitted in a single communication.

13. The relay Internet facsimile apparatus according to claim 10, the communicator further being configured to transmit, to the facsimile apparatus, an indication that the relay Internet facsimile apparatus is configured to receive plural sub-addresses in a single communication.

14. A communication method for transmitting image data via a relay Internet facsimile apparatus to a plurality of receiving Internet facsimile apparatuses using a facsimile apparatus, each of the plurality of the receiving Internet facsimile apparatuses having a sub-address and an IP address, the facsimile apparatus transmitting the image data to the relay Internet facsimile apparatus via PSTN (Public Switched Telephone Networks), the communication method comprising:

inputting predetermined information identifying the relay Internet facsimile apparatus and sub-addresses of the plurality of receiving Internet facsimile apparatuses, the relay Internet facsimile apparatus having a memory that stores a plurality of IP addresses of the receiving Internet facsimile apparatuses corresponding to the plurality of the sub-addresses of the receiving Internet facsimile apparatuses;

scanning the image data;

transmitting, when the predetermined information and the sub-addresses of the plurality of receiving Internet facsimile apparatuses are input, to the relay Internet facsimile apparatus via the PSTN, the scanned image data and the plurality of the input sub-addresses of the receiving Internet facsimile apparatuses, based on the input predetermined information identifying the relay Internet facsimile apparatus, the relay Internet facsimile apparatus determining whether the sub-addresses of the plurality of receiving Internet facsimile apparatuses are received from the facsimile apparatus, the relay Internet facsimile apparatus converting the transmitted image data into data for Internet transmission and relaying the converted data to the plurality of the receiving Internet facsimile apparatuses via the Internet, based on the plurality of the IP addresses of the receiving Internet facsimile apparatuses corresponding to the sub-addresses of the plurality of receiving Internet facsimile apparatuses stored in the memory of the relay Internet facsimile apparatus, when it is determined that the sub-addresses of the plurality of receiving Internet facsimile apparatuses are received from the facsimile apparatus, the relay Internet facsimile apparatus printing out the transmitted image data when it is determined that the sub-addresses of the plurality of receiving Internet facsimile apparatuses are not received from the Internet facsimile apparatus.

15. The communication method according to claim 14, wherein the inputting further includes inputting at least two sub-addresses as a group, whereby scanned image data can be transmitted, in a single transmission, to each of the receiving Internet facsimile apparatuses identified by the plurality of IP addresses corresponding to each of the sub-addresses in the group.

16. The communication method according to claim 14, further comprising transmitting, to the relay Internet facsimile apparatus, the plurality of addresses of the receiving Internet facsimile apparatuses in response to the relay Internet facsimile apparatus transmitting, to the facsimile apparatus, an indication that the relay Internet facsimile apparatus is configured to receive plural sub-addresses in a single communication.

17. The communication method according to claim 14, the transmitting comprising, transmitting the plurality of input sub-addresses of the receiving Internet facsimile apparatuses, in a single facsimile transmission.

* * * * *